US011941924B2

(12) United States Patent
Nakashima

(10) Patent No.: US 11,941,924 B2
(45) Date of Patent: Mar. 26, 2024

(54) CONTROL DEVICE, VEHICLE, NON-TRANSITORY STORAGE MEDIUM, AND OPERATION METHOD OF CONTROL DEVICE

(71) Applicant: TOYOTA JIDOSHA KABUSHIKI KAISHA, Toyota (JP)

(72) Inventor: Toyokazu Nakashima, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 28 days.

(21) Appl. No.: 17/500,227

(22) Filed: Oct. 13, 2021

(65) Prior Publication Data

US 2022/0180675 A1 Jun. 9, 2022

(30) Foreign Application Priority Data

Dec. 9, 2020 (JP) ................................ 2020-204482

(51) Int. Cl.
*H04N 5/44* (2011.01)
*G07C 5/08* (2006.01)

(52) U.S. Cl.
CPC ......... *G07C 5/0825* (2013.01); *G07C 5/0841* (2013.01)

(58) Field of Classification Search
CPC .... G07C 5/0825; G07C 5/0841; B60R 16/02; B60K 35/00
See application file for complete search history.

(56) References Cited

U.S. PATENT DOCUMENTS 5,684,701 A * 11/1997 Breed .................. B60R 21/013 180/282
8,935,013 B2 * 1/2015 Wanami ................. G07C 5/085 701/1
10,354,230 B1 * 7/2019 Hanson .................. G07B 15/00
2007/0106474 A1 * 5/2007 Ide ......................... G08G 1/161 340/436
2014/0200738 A1 * 7/2014 Wanami .................. B60R 21/01 701/1
2020/0066069 A1 * 2/2020 Kapoor .................. G07C 5/085
2021/0295441 A1 * 9/2021 Mullen .................... G08G 1/04

FOREIGN PATENT DOCUMENTS

JP 2010-002322 A 1/2010
JP 2014-108726 A 6/2014

* cited by examiner

*Primary Examiner* — Munear T Akki
(74) *Attorney, Agent, or Firm* — Oblon, McClelland, Maier & Neustadt, L.L.P.

(57) ABSTRACT

A control device, based on a detection result of first equipment that detects a first state of a vehicle, displays information corresponding to a predetermined event on a display device that displays a detection result of second equipment that detects a second state of the vehicle.

11 Claims, 4 Drawing Sheets

CONTROL DEVICE, VEHICLE, NON-TRANSITORY STORAGE MEDIUM, AND OPERATION METHOD OF CONTROL DEVICE

CROSS-REFERENCE TO RELATED APPLICATION

This application claims priority to Japanese Patent Application No. 2020-204482 filed on Dec. 9, 2020, incorporated herein by reference in its entirety.

BACKGROUND

1. Technical Field

The present disclosure relates to a control device, a vehicle, a non-transitory storage medium, and an operation method of the control device.

2. Description of Related Art

Users who are planning to purchase used vehicles, and dealers going in between resale of vehicles, confirm whether vehicles have encountered trouble such as accidents, flooding, and so forth, in order to judge resale prices of the vehicles. As an example of a method for managing accident history of vehicles, Japanese Unexamined Patent Application Publication No. 2014-108726 (JP 2014-108726 A) discloses technology to judge whether a vehicle has encountered an accident, from discrepancy between a cumulative traveling distance found from a time integral of vehicle speed and an odometer value.

SUMMARY

A control device and so forth that enable easy recognition of whether a vehicle has encountered an accident or the like are disclosed below.

A control device according to an aspect of the present disclosure includes a control unit configured to, based on a detection result of first equipment that detects a first state of a vehicle, display information corresponding to a predetermined event on a display device that displays a detection result of second equipment that detects a second state of the vehicle.

In the above control device, the control device may further include a storage unit configured to store history of the predetermined event.

In the above control device, the control unit may be configured to display the information corresponding to the predetermined event, along with the detection result of the second equipment, on the display device.

In the above control device, the control unit may be configured to display the information corresponding to the predetermined event on the display device in response to predetermined input.

In the above control device, the first state may include occurrence of acceleration of the vehicle, or occurrence of operation of an airbag.

In the above control device, the second state may include a traveling state of the vehicle, and the detection result of the second equipment may include traveling distance of the vehicle.

Another aspect of the present disclosure provides a non-transitory storage medium. This non-transitory storage medium stores programs that are executable by one or more processors and that cause the one or more processors to execute steps including a step of causing a control device to, based on a detection result of first equipment that detects a first state of a vehicle, display information corresponding to a predetermined event on a display device that displays a detection result of second equipment that detects a second state of the vehicle.

Another aspect of the present disclosure provides an operation method of a control device installed in a vehicle. This operation method includes a step of, based on a detection result of first equipment that detects a first state of the vehicle, displaying information corresponding to a predetermined event on a display device that displays a detection result of second equipment that detects a second state of the vehicle.

Another aspect of the present disclosure provides a vehicle in which the control device is installed.

According to the control device and so forth of the present disclosure, easy recognition of whether a vehicle has encountered an accident or the like is enabled.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment will be described below.

Figure 1:
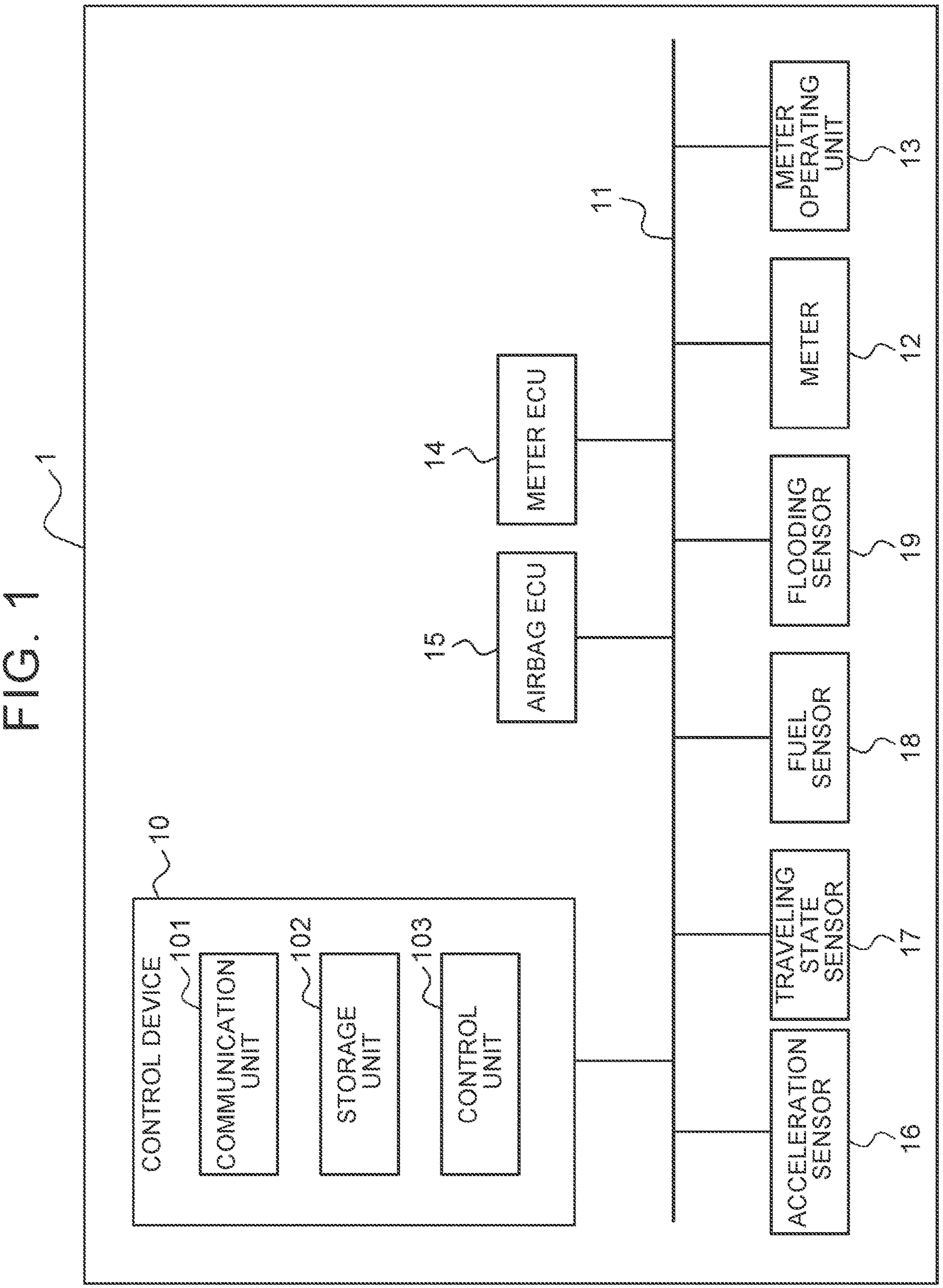
FIG. 1 is a diagram illustrating a configuration example of a control device.

FIG. 1 is a diagram illustrating a configuration example of a control device according to an embodiment. A control device 10 is an information processing device that operates under supply of electric power from a battery of a vehicle 1 that is installed in the vehicle 1 such as a passenger car, a multipurpose vehicle, a company vehicle, or the like, and is connected to an in-vehicle network 11. Further connected to the in-vehicle network 11 are equipment and devices such as a meter 12, a meter operating unit 13, a meter electronic control unit (ECU) 14, an airbag ECU 15, various types of sensors 16 through 18, and so forth. The equipment and devices connected to the in-vehicle network 11 are configured to be capable of communication of information with each other via the in-vehicle network 11. The control device 10 is an ECU, for example. Alternatively, the control device 10 may be an information terminal device such as an automotive navigation device, smartphone, tablet terminal device, personal computer, or the like, that has a communication interface that is compatible with the in-vehicle network 11. The in-vehicle network 11 is a network conforming to a standard such as Controller Area Network (CAN) or the like. The meter 12 includes a speedometer and an engine tachometer that indicate the operating state of the vehicle 1, an odometer and a trip member that indicate traveling distance, a fuel meter that indicates remaining amount of fuel, and so forth. The meter ECU 14 generates and sends to the meter 12 information to be displayed on the meter 12. For example, the meter ECU 14 receives detection results of the vehicle speed of the vehicle 1, engine revolutions, traveling distance, and so forth, from a traveling state sensor 17, receives detection results indicating the remaining amount of fuel from a fuel sensor 18 and sends information indicating these detection results to the meter 12. Functions of the meter ECU 14 may be borne by the control device 10, with the control device 10 also serving as the meter ECU 14. The meter operating unit 13 has an input interface for operating display of the meter 12, an operating button for toggling between display of the odometer and display of the trip meter for example, or clearing the trip meter, and so forth, and sends signals corresponding to operations to the meter ECU 14. The airbag ECU 15 controls and detects behavior of airbags via the in-vehicle network 11, and also stores history of behavior of the airbags. An acceleration sensor 16 detects acceleration applied to the vehicle body, and outputs signals indicating detection results. The traveling state sensor 17 includes sensors for detecting wheel rotations, engine revolutions, vehicle speed, and so forth, and outputs signals indicating detection results of the sensors. For example, traveling distance is detected based on the rotations of the wheels, the vehicle speed, the amount of time elapsed, and so forth. A flooding sensor 19 is attached to a position of the vehicle body that would come into water when the vehicle 1 is flooded, and detects contact with water and outputs signals indicating detection results.

In the present embodiment, a control unit 103 of the control device 10 displays information corresponding to a predetermined event, i.e., information indicating whether there is an accident or flooding, on a display device that displays detection results of second equipment (traveling state sensor 17) that detects a second state of the vehicle 1, i.e., on the meter 12, based on detection results of first equipment (acceleration sensor 16, airbag ECU 15, flooding sensor 19) that detects a first state of the vehicle 1. The first state of the vehicle 1 here includes states such as rapid deceleration of the vehicle 1, occurrence of activation of airbags, flooding, and so forth. Also, the second state includes vehicle speed, traveling distance, and so forth.

The control unit 103 determines occurrence of accidents using detection results from standard accessories such as the acceleration sensor 16 and the airbag ECU 15, and accordingly additional configurations for determining occurrence of accidents is not necessary. Also, the control unit 103 displays history of occurrence of accidents and flooding on the meter 12 originally intended to display traveling distance, and so forth. Accordingly, users and the like can easily recognize whether accidents or the like have occurred.

Parts of the control device 10 will be described.

A communication unit 101 has a communication module supporting one or more wired or wireless standards, to connect to the in-vehicle network 11. For example, the communication unit 101 is connected to the in-vehicle network 11 by a communication module supporting a standard such as CAN or the like. The communication unit 101 receives detection results of each of the acceleration sensor 16 and the flooding sensor 19, and information indicating detection results of behavior of the airbags from the airbag ECU 15, and hands these to the control unit 103. The communication unit 101 also sends instructions and information generated by the control unit 103 toward the meter ECU 14. Further, the communication unit 101 may include one or more global navigation satellite system (GNSS) receivers or have a communication module that is communicable with a GNSS receiver. Examples of GNSS include at least one of the Global Positioning System (GPS), the Quasi-Zenith Satellite System (QZSS), the BeiDou Navigation Satellite System (BDS), Global Navigation Satellite System (GLONASS), and Galileo. The communication unit 101 receives GNSS signals, and hands the received signals to the control unit 103.

A storage unit 102 has, for example, semiconductor memory, magnetic memory, optical memory, or the like. The storage unit 102 functions as a main storage device, an auxiliary storage device, or cache memory, for example. The storage unit 102 stores optional information, control and processing programs, and so forth, used for operation of the control unit 103. The storage unit 102 also stores history of accidents and flooding occurring, as determined by the control unit 103.

The control unit 103 has, for example, one or more general-purpose processors such as a central processing unit (CPU) or the like, or one or more dedicated processors that are specialized for particular processing. Alternatively, the control unit 103 may have one or more dedicated circuits such as a field-programmable gate array (FPGA), an application specific integrated circuit (ASIC), or the like. The control unit 103 realizes operations of the present embodiment by operating following control and processing programs, or operating following operation procedures implemented in circuitry.

Figure 2:
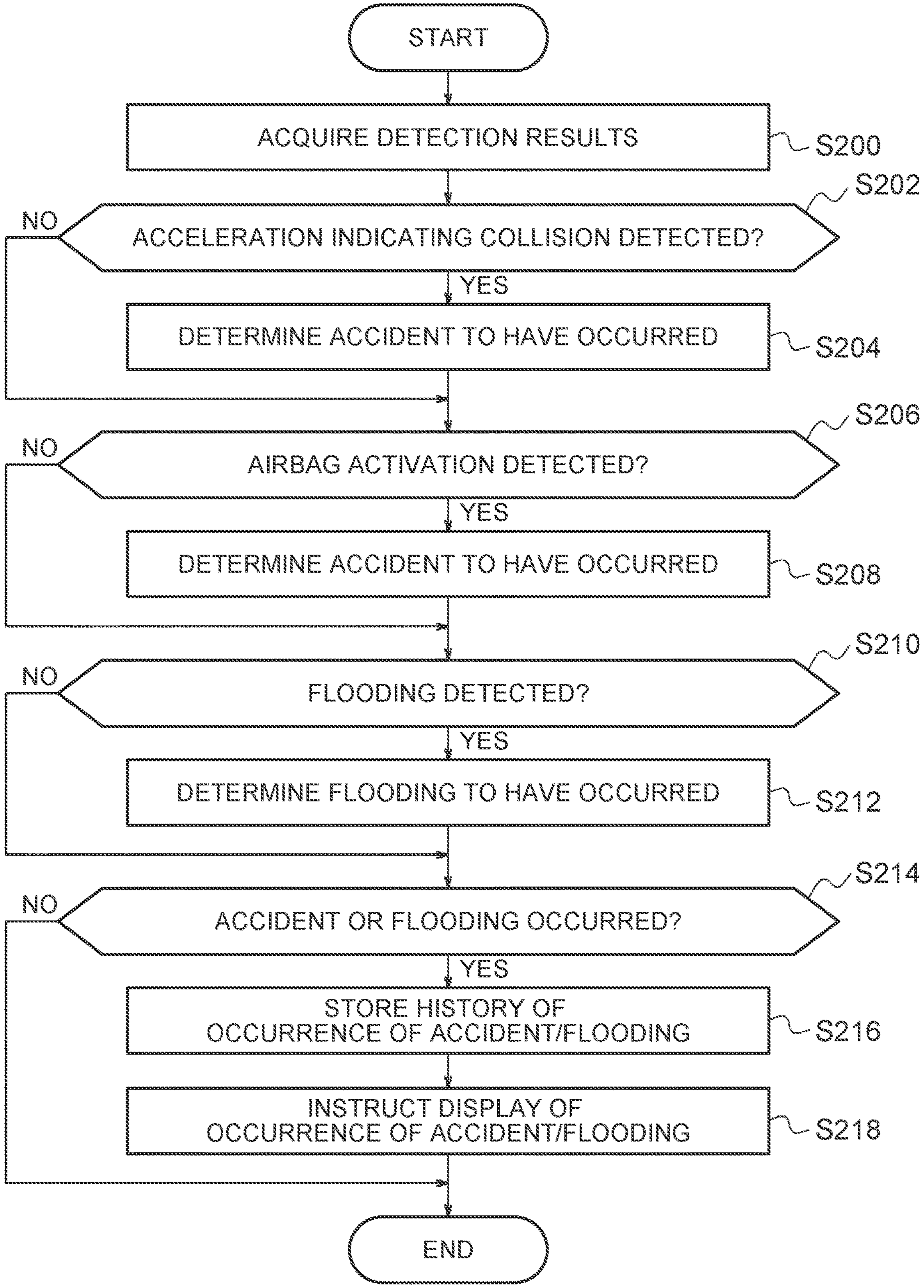
FIG. 2 is a flowchart showing an example of operation procedures of the control device.

FIG. 2 is a flowchart for describing an example of operation procedures of the control device 10 according to the present embodiment. The operation procedures in FIG. 2 are executed by the control unit 103 at an optional cycle (e.g., at intervals of several seconds to several minutes) when power to the control device 10 is turned on by the ignition of the vehicle 1 being turned on, and the control device 10 is operating, for example.

In step S200, the control unit 103 acquires detection results from the various types of equipment and the devices of the vehicle 1. The control unit 103 receives the detection results of each of the acceleration sensor 16, the traveling state sensor 17, the flooding sensor 19, and the airbag ECU 15, via the communication unit 101.

In step S202, the control unit 103 determines whether acceleration indicating a collision has been detected. For example, when an absolute value of detected acceleration is no less than an optionally set reference value, the control unit 103 determines that acceleration indicating a collision has been detected (Yes in step S202), and advances to step S204. Then in step S204, the control unit 103 determines that an accident has occurred. The reference value regarding the absolute value of acceleration is stored in the storage unit 102, having been set in advance to an optional magnitude indicating a reasonable probability of the vehicle 1 having collided with an object, such as another vehicle or the like. On the other hand, when the absolute value of the detected acceleration is smaller than the reference value, the control unit 103 determines that acceleration indicating a collision has not been detected (No in step S202), and advances to step S206 without executing step S204.

In step S206, the control unit 103 determines whether airbag activation has been detected. For example, when detection results indicating airbag activation having occurred are received from the airbag ECU 15 (Yes in step S206), the control unit 103 advances to step S208. An occurrence of an airbag activation indicating occurrence of an accident has been detected, and accordingly the control unit 103 determines in step S208 that an accident has occurred. On the other hand, when detection results indicating an airbag activation are not received (No in step S206), the control unit 103 advances to step S210 without executing step S208.

In step S210, the control unit 103 determines whether flooding has been detected. For example, when detection results indicating contact with water are received from the flooding sensor 19 (Yes in step S210), the control unit 103 advances to step S212. Then in step S212, the control unit 103 determines that flooding has occurred. On the other hand, when detection results indicating contact with water are not received (No in step S210), the control unit 103 advances to step S214 without executing step S212.

Note that in the above, instead of detection results from the flooding sensor 19, the control unit 103 may determine detection of flooding using diagnosis signals from a pair ECUs such as a pair of the airbag ECUs 15 that control each of right and left airbags, a pair of wheel ECUs that detect operation of right and left or front and rear wheels, a pair of brake ECUs that control and detect braking by right and left or front and rear brakes, a pair of seat ECUs that control operation of right and left or front and rear seats, or the like. These ECU pairs are disposed on the right and left or the front and rear of the bottom portion of the vehicle 1, and when both output diagnosis signals, there is a greater reasonable probability suggesting immersion in water due to flooding as compared to a collision accident. Accordingly, the control unit 103 of the control device 10 can determine that flooding has occurred when acquiring diagnosis signals from both ECUs of the ECU pair.

In step S214, the control unit 103 determines whether an accident or flooding has occurred. For example, when having determined in step S204 or step S208 that an accident has occurred, or when determining in step S212 that flooding has occurred (Yes in step S214), the control unit 103 advances to step S216. In step S216, the control unit 103 then stores history of occurrence of the accident or occurrence of the flooding in the storage unit 102. Then in step S218, the control unit 103 sends information and an instruction to the meter ECU 14, to output a display indicating occurrence of the accident or the flooding to the meter 12, and ends procedures of FIG. 2. On the other hand, when determining neither occurrence of an accident nor occurrence of flooding, the control unit 103 ends the procedures of FIG. 2 without executing steps S216 and step S218.

Figure 3A:
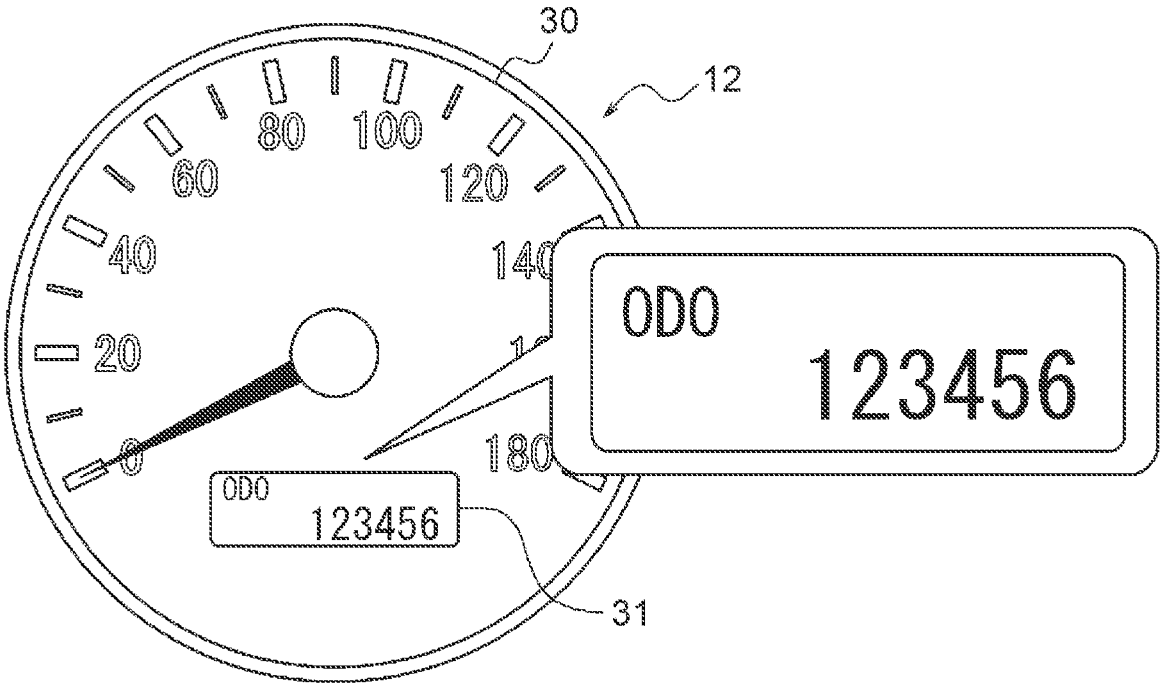
FIG. 3A is a diagram illustrating a display example of a display device.
Figure 3B:
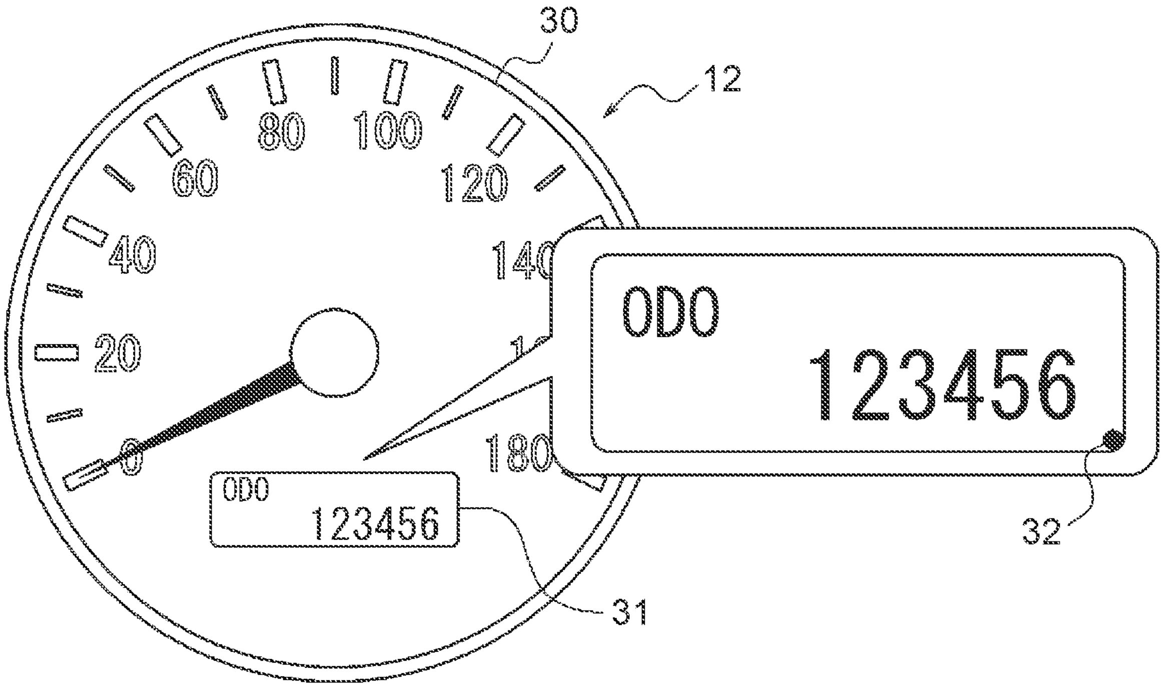
FIG. 3B is a diagram illustrating a display example of the display device.
Figure 3C:
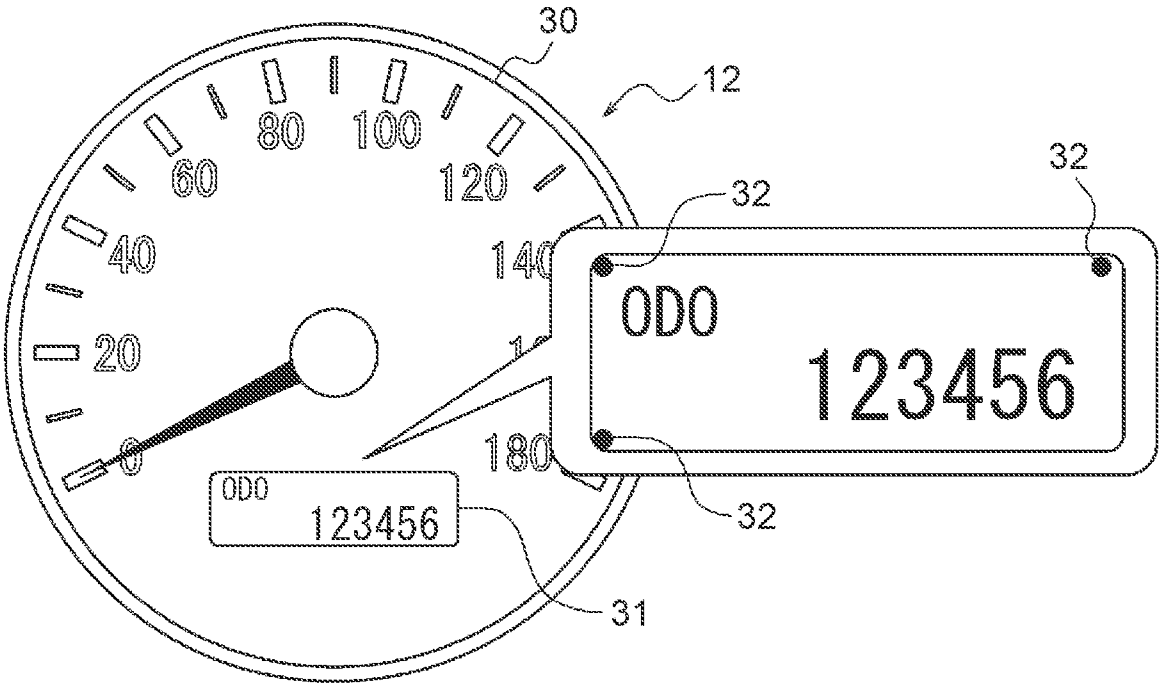
FIG. 3C is a diagram illustrating a display example of the display device.
Figure 3D:
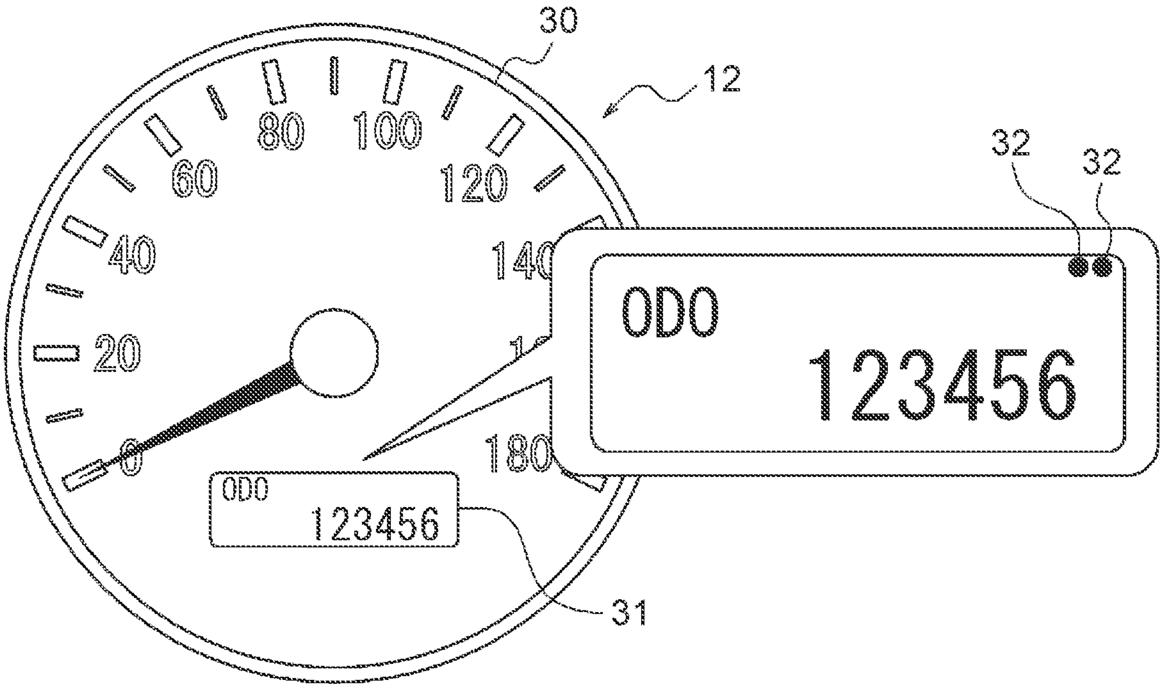
FIG. 3D is a diagram illustrating a display example of the display device.

FIGS. 3A through 3D illustrate examples of display forms of information on the meter 12. FIG. 3A illustrates a display example of the meter 12 in a normal state, and FIGS. 3B through 3D illustrate examples of display of information indicating history that an accident or flooding has occurred.

The meter 12 has a speedometer 30 and an odometer 31 as standard accessories, as illustrated in FIG. 3A. The meter 12 has a liquid crystal display (LCD) or an electroluminescence (EL) display, and a control circuit thereof, for example. The speedometer 30 shows the vehicle speed of the vehicle 1. A state is illustrated here in which the vehicle 1 is stopped, i.e., the vehicle speed is zero. Also, the odometer 31 shows the cumulative traveling distance. A case of a cumulative traveling distance of 123,456 km is illustrated here, for example.

When displaying information indicating history of an accident or flooding having occurred in the meter 12, a black circle or a dot is displayed at the lower right corner of the odometer 31, as illustrated in FIG. 3B. This display 32 indicates that there is history of an accident or flooding that has occurred. The position of the display 32 may alternatively be at the upper right or upper or lower left corners of the odometer 31 as illustrated in FIG. 3C. The display 32 binarily indicates whether there is history of an accident or flooding that has occurred. That is to say, a state in which the display 32 is displayed indicates that there is history of an accident or flooding that has occurred, and a state in which the display 32 is not displayed indicates that there is no such history. Alternatively, the form of the display 32 may be such that the number of black circles or dots increases in accordance with accumulation of history, as illustrated in FIG. 3D. Note that the black circle or the dot as the form of the display 32 is exemplary, and may be an underscore ("_"), hyphen ("-"), asterisk ("*"), or the like, for example. Regardless, the display 32 is preferably displayed at a position and in a form that is not prominent in comparison with the display of the cumulative traveling distance.

Also, the control unit 103 may instruct the meter ECU 14 to display the display 32 in response to a user operation performed on the meter operating unit 13. For example, in the state illustrated in FIG. 3A, the control unit 103 may send an instruction to the meter ECU 14 so as to switch the form of display to that illustrated in FIGS. 3B through 3D, in response to an operation such as a long press operation or pressing a plurality of times in rapid succession on a button for switching between display of the trip meter and display of the odometer.

Although an example has been shown above in which history of occurrence of an accident or flooding is displayed in the odometer 31 of the meter 12, a configuration may be made in which history of occurrence of an accident or flooding is displayed using part of the remaining fuel display of the meter 12, for example.

According to the present embodiment, resale dealers and users desiring to purchase can easily comprehend the state of the vehicle 1, by easily displaying whether there is history of an accident or flooding of the vehicle 1. History of accidents and flooding is managed by the control device 10 using standard equipment installed in the vehicle 1, and accordingly history of accidents and flooding can be retained in the vehicle 1 itself, even when maintenance records of the vehicle 1 and so forth are incomplete. Also, by storing history of accidents and flooding in the control device 10, the history can be retained in the vehicle 1 even when the meter 12 is replaced, altered, or modified.

Processing and control programs that define operations of the control device 10 may be stored in a storage unit of an optional server device to which the control device 10 is capable of connecting, and be downloaded to the control device 10, or may be stored in a portable and non-transitory storage medium that is readable by the control device 10, and read by the control device 10 from the medium. Such programs are executable by one or a plurality of processors of the control unit 103 of the control device 10.

Although the embodiment has been described above based on the drawings and examples, it should be noted that one skilled in the art can easily make various types of modifications and alterations based on the present disclosure. Accordingly, it should be noticed that all such modifications and alterations are encompassed by the scope of the present disclosure. For example, the functions and so forth included in the means, the steps, and so forth, may be rearranged insofar as there is no logical contradiction, and a plurality of means, steps, and so forth may be combined into one, or may be divided.

What is claimed is:

1. A control device, comprising a control unit configured to:

determine whether an accident has occurred in response to detection of an acceleration indicating a collision or an airbag activation;

determine whether flooding has occurred in response to detection of results indicating contact with water that is received from a flooding sensor or a diagnosis signal that is received from a pair of ECUs;

storing a history of occurrence of a detected accident or flooding in a storage unit; and transmitting information and an instruction to a meter ECU to output a display indicating the occurrence of the detected accident or flooding by a meter in order to judge a resale value of the vehicle, wherein a dot is displayed in a corner of an odometer when displaying information indicating history of an accident or flooding having occurred in the meter and the number of dots increases in accordance with accumulation of history.

2. The control device according to claim 1, wherein the control device is installed in the vehicle.

3. A non-transitory storage medium storing programs that are executable by one or more processors and that cause the one or more processors to execute steps comprising:

determine whether an accident has occurred in response to detection of an acceleration indicating a collision or an airbag activation;

determine whether flooding has occurred in response to detection of results indicating contact with water that is received from a flooding sensor or a diagnosis signal that is received from a pair of ECUs;

storing a history of occurrence of a detected accident or flooding in a storage unit; and transmitting information and an instruction to a meter ECU to output a display indicating the occurrence of the detected accident or flooding by a meter in order to judge a resale value of the vehicle, wherein a dot is displayed in a corner of an odometer when displaying information indicating history of an accident or flooding having occurred in the meter and the number of dots increases in accordance with accumulation of history.

4. The control device according to claim 1, wherein the pair of ECUs are a pair of the airbag ECUs that control each of right and left airbags, a pair of wheel ECUs that detect operation of right and left or front and rear wheels, a pair of brake ECUs that control and detect braking by right and left or front and rear brakes, or a pair of seat ECUs that control operation of right and left or front and rear seats.

5. The control device according to claim 1, wherein the display by the meter binarily indicates whether there is history of an accident or flooding that has occurred.

6. The control device according to claim 1, wherein display by the meter is displayed at a position and in a form that is not prominent in comparison with the display of a cumulative traveling distance of the vehicle.

7. The control device according to claim 1, wherein the control unit instructs the meter ECU to display the display on the meter in response to a user operation performed on a meter operating unit.

8. The non-transitory storage medium according to claim 3, wherein the pair of ECUs are a pair of the airbag ECUs that control each of right and left airbags, a pair of wheel ECUs that detect operation of right and left or front and rear wheels, a pair of brake ECUs that control and detect braking by right and left or front and rear brakes, or a pair of seat ECUs that control operation of right and left or front and rear seats.

9. The non-transitory storage medium according to claim 3, wherein the display by the meter binarily indicates whether there is history of an accident or flooding that has occurred.

10. The non-transitory storage medium according to claim 3, wherein display by the meter is displayed at a position and in a form that is not prominent in comparison with the display of a cumulative traveling distance of the vehicle.

11. The non-transitory storage medium according to claim 3, wherein the control unit instructs the meter ECU to display the display on the meter in response to a user operation performed on a meter operating unit.

* * * * *